(12) United States Patent
Kondo et al.

(10) Patent No.: US 6,948,092 B2
(45) Date of Patent: Sep. 20, 2005

(54) SYSTEM RECOVERY FROM ERRORS FOR PROCESSOR AND ASSOCIATED COMPONENTS

(75) Inventors: Thomas J. Kondo, Santa Clara, CA (US); James S. Klecka, Georgetown, TX (US); Robert L. Jardine, Cupertino, CA (US); William P. Bunton, Pflugerville, TX (US); Graham B. Stott, Dublin, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 547 days.

(21) Appl. No.: 10/061,435

(22) Filed: Jan. 31, 2002

(65) Prior Publication Data

US 2002/0144177 A1 Oct. 3, 2002

Related U.S. Application Data

(63) Continuation-in-part of application No. 09/209,635, filed on Dec. 10, 1998, now Pat. No. 6,393,582.

(51) Int. Cl.$^7$ .............................................. G06F 11/00
(52) U.S. Cl. ......................................... 714/12; 714/48
(58) Field of Search ............................... 714/11, 12, 10, 714/4, 23, 16, 17, 48; 709/208, 209, 250

(56) References Cited

U.S. PATENT DOCUMENTS

| | | | |
|---|---|---|---|
| 4,096,990 A | 6/1978 | Strelow ...................... 235/307 |
| 4,176,258 A | 11/1979 | Jackson ...................... 235/302 |
| 4,541,094 A | 9/1985 | Stiffler et al. ................. 371/68 |
| 4,589,090 A | * 5/1986 | Downing et al. ............. 714/10 |
| 4,723,245 A | 2/1988 | Leslie ......................... 371/37 |
| 4,843,608 A | 6/1989 | Fu et al. ...................... 371/68 |
| 5,065,312 A | 11/1991 | Bruckert et al. ............ 395/575 |
| 5,345,583 A | * 9/1994 | Davis .......................... 714/23 |
| 5,689,632 A | 11/1997 | Galy et al. ............. 395/182.09 |
| 5,748,873 A | * 5/1998 | Ohguro et al. ................ 714/11 |
| 5,838,894 A | 11/1998 | Horst ..................... 395/182.09 |
| 5,915,082 A | * 6/1999 | Marshall et al. .............. 714/11 |
| 5,953,742 A | 9/1999 | Williams .................... 711/154 |
| 6,233,702 B1 | * 5/2001 | Horst et al. ................... 714/48 |
| 6,327,675 B1 | * 12/2001 | Burdett et al. ................ 714/11 |
| 6,587,961 B1 | * 7/2003 | Garnett et al. ................ 714/11 |
| 6,658,532 B1 | * 12/2003 | Horrigan et al. ............ 711/135 |
| 6,751,749 B2 | * 6/2004 | Hofstee et al. ............... 714/11 |
| 2002/0152418 A1 | * 10/2002 | Griffin et al. ................. 714/11 |

OTHER PUBLICATIONS

IEEE 100, "The Authoritative Dictionary of IEEE Standards Terms", Seventh Ed., The Institute of Electrical and Electronics Engineering, Inc., 2000, pp. 128, 129.*

* cited by examiner

Primary Examiner—Robert Beausoliel
Assistant Examiner—Aaron D. Matthew

(57) ABSTRACT

A computer system includes a primary processor and a secondary processor running in lockstep. The lockstep may or may not be synchronous. Errors occurring in the primary processor or the secondary processor are reported to an error-handling module. If the error is a recoverable error, the state of one of the processors is saved and the processors are restarted using the saved state. In addition to the reporting of errors from the processors, cross checking of the operation of the processors is performed to detect a divergence in the operation of the processors. If the divergence is reported to be due to a recoverable error, the state of the one of the processors is saved and the processors are restarted using the saved state. Procedures are also disclosed to ensure that data corruption does not propagate onto an associated network, and to ensure that the system is not lost as a network resource during processor restart.

42 Claims, 3 Drawing Sheets

SYSTEM RECOVERY FROM ERRORS FOR PROCESSOR AND ASSOCIATED COMPONENTS

RELATED APPLICATIONS

This is a continuation-in-part of U.S. patent application Ser. No. 09/209,635 filed on Dec. 10, 1998 entitled "ERROR SELF-CHECKING AND RECOVERY USING LOCKSTEP PROCESSOR PAIR ARCHITECTURE," (Pat. No. 6,393,582 issued May 21, 2002), the disclosure of which is incorporated herein by reference as if explicitly set forth.

BACKGROUND OF THE INVENTION

The invention relates generally to fault-tolerant data processing systems and more particularly to a method, and apparatus implementing that method, for recovering from recoverable errors in such a manner as to reduce the impact of the recoverable error on external devices or software utilizing the processing system. The invention may advantageously be applied, for example, in processing systems using two or more lockstep processors for error-checking, Among the important aspects of a fault-tolerant architecture are (1) the ability to tolerate a failure of a component and continue operating, and (2) to maintain data integrity in the face of a fault or failure. The first aspect often sees employment of redundant circuit paths in a system, so that a failure of one path will not halt operation of the system.

One fault-tolerant architecture involves the use of self-checking circuitry, which often involves using substantially identical modules that receive the same inputs to produce the same outputs, and those outputs are compared. If the comparison sees a mismatch, both modules are halted in order to prevent a spread of possible corrupt data. Examples of self-checking may be found in U.S. Pat. Nos. 4,176,258, 4,723,245, 4,541,094, and 4,843,608.

One strong form of self-checking error detection is the use of processor pairs (and some of the associated circuitry) operating in "lockstep" to execute an identical or substantially identical instruction stream. The term lockstep refers to the fact that the two processors execute identical instruction sequences, instruction-by-instruction. When in lockstep, the processors may be tightly synchronized or, if not synchronized, the one processor may lag the other processor by a number of cycles. According to the lockstep technique, often referred to as a "duplicate and compare" technique, each processor in the pair receives the same input information to produce the same results. Those results are compared to determine if one or the other encountered an error or developed a fault. The strength of this type of error detection stems from the fact that it is extremely improbable that both processors will make identical mistakes at exactly the same time.

Fault tolerant designs may take a "fail fast" approach. That is, when the processor detects an error, it simply stops. Recovery from such an error stop is not the responsibility of the processor; rather, recovery is accomplished at the system level. The only responsibility of the processor is to stop quickly—before any incorrect results can propagate to other modules. The lockstep/compare approach to processor error detection fits well with this fail-fast approach. In principle, when a divergence between the lockstep operation of the processors is detected, the processors could simply stop executing.

As integrated circuit technology has advanced, more and more circuitry can be put on an integrated chip. Thus, on-chip processors (microprocessors) are capable of being provided very large cache memories that bring with them the advantage of fewer main memory accesses. However, such cache memories are subject to soft (transient) errors, produced, for example, by alpha particle emissions and cosmic-ray induced errors. Accordingly, it is common to find such caches protected by error correcting codes. Otherwise, the error rate of these on-chip memories would cause processor failures at a rate that is not tolerable, even by non-fault-tolerant system vendors. The error correcting codes allow the processor to recover from these soft (correctable) errors in much the same way as main-memory ECC have allowed most soft memory errors to be tolerated. However, this gives rise to a side-effect in lockstepped designs: The detection and recovery from a correctable cache error will usually cause a difference in cycle-by-cycle behavior of the two processors (a divergence), because the recoverable error occurs in only one of the two devices.

One solution to this problem is to have the error correction logic always perform its corrections in-line (a.k.a. in "zero time"), but this approach can require extra circuitry in the access path, resulting in slower accesses even in the absence of the error. This approach, therefore, is often deemed unacceptable for high speed designs, because of the associated performance penalty.

SUMMARY OF THE INVENTION

According to one aspect of the invention there is provided a method of error recovery in a lockstep computer processing system, the system comprising a primary processor and a secondary processor and a bridge to a network, comprising the steps of:

operating the primary and secondary processors in lockstep;

receiving an error notification resulting from an error in either the primary processor or the secondary processor;

determining if the error is a recoverable error; and if the error is a recoverable error, then saving the state of either the primary or the secondary processor to a memory; and resetting and restarting the primary and secondary processors using the saved state.

The method may further comprise the steps of:

detecting a divergence in the operation of the primary and secondary processors before receiving the error notification;

waiting for a predetermined time after detecting the divergence; and if the error notification is received before the expiry of the predetermined time and if the error is determined to be a recoverable error, then treating the error as a recoverable error.

Still further, if the error notification is received after the expiry of the predetermined time, then the error may be treated as a non-recoverable error.

Also, a non-recoverable error on the secondary processor may be treated as a recoverable error.

If the error is determined to be a non-recoverable error, then the method may further comprise:

disabling the bridge to the network before data corruption resulting from the error can propagate onto the network.

Also, a hardware error that results in the loss of a resource that is currently not being used by the primary processor may be treated as a recoverable error.

The error notification from the processor may report an error occurring in a hardware resource, the error notification including an indication as to whether the hardware resource is critical or non-critical.

In use, a hardware resource may be disabled if an error occurs in the hardware resource and it is a non-critical resource. Also, the hardware resource may be retried after processor restart to determine if the error in the hardware resource can be cured by the processor reset.

According to another aspect of the invention, the system includes a single main memory, and the step of detecting divergence comprises the steps of:

comparing memory commands generated by the primary processor with memory commands generated by the secondary processor;

executing only the memory commands generated by the primary processor; and signaling a divergence detection if the memory commands issued by the primary processor differ from the memory commands issued by the secondary processor.

The method may further comprise the steps of:

detecting a divergence in the operation of the primary and secondary processors at the bridge to the network; and shutting off the bridge to the network immediately unless the error has previously been determined to be a recoverable error.

According to yet another aspect of the invention, the divergence detection is conducted by comparing unique signatures of processor state received from the primary and secondary processors. The unique signatures may be generated by applying an algorithm to state information for the primary and secondary processors.

According to a further aspect of the invention, the method may further comprise the steps of conducting first and second flushes of cache memory of either the primary or the secondary processor.

Still further, the method may include the step of conducting a high-speed reset and restart of the bridge to the network. The bridge to the network may have a custom high-speed reset and restart procedure, or may be designed from scratch to have reset and restart quickly.

According to another aspect of the invention, the method may include the steps of:

setting a watchdog timer; and treating the error as a non-recoverable error if the watchdog timer expires.

When the watchdog timer expires, the step of treating the error as a non-recoverable error may comprise the step of conducting a hard-reset of the lockstep computer processing system.

Still further, the step of restarting the primary and secondary processors using the saved state further may include the step of:

running the bridge to the network from a main memory until a bridge local memory has been initialized.

According to another aspect of the invention, when the lockstep computer processing system is being utilized by a network resource, the method further comprises the steps of the network resource:

sending a data message to the lockstep computer processing system, the data message being lost due to the resetting and restarting of the primary and secondary processors;

sending a first inquiry message to the lockstep computer processing system after a first timeout period, the first inquiry message being lost due to the lockstep computer processing system being unavailable; and sending a second inquiry message after a second timeout period;

wherein the sum of the first and second timeout periods is selected to be greater than an expected recovery time for the lockstep computer processing system.

According to another aspect of the invention there is provided a computer system comprising:

a primary processor and a secondary processor being configured to operate in lockstep; and an error-handling module to receive an error notification resulting from an error in either the primary processor or the secondary processor, to determine if the error is a recoverable error, and, if the error is a recoverable error, then to initiate saving the state of either the primary or the secondary processor to a memory and to reset and restart the primary and secondary processors using the saved state.

The error-handling module may be further configured to receive a notification of a divergence in the operation of the primary and secondary processors before receiving the error notification, the error-handling module then being further configured to wait for a predetermined time after receiving the notification of divergence; and if the error notification is received before the expiry of the predetermined time and if the error is determined to be a recoverable error, to treat the error as a recoverable error.

If the error notification is received after the expiry of the predetermined time, then the error-handling module may treat the error as a non-recoverable error. Also, a non-recoverable error on the secondary processor may be treated as a recoverable error.

Still further, the system may further comprise a bridge to a network, wherein if the error is determined to be a non-recoverable error, then the system is configured to disable the bridge to the network before data corruption resulting from the error can propagate onto the network.

According to another aspect of the invention, a hardware error that results in a loss of a resource that is not being used by the primary processor is treated as a recoverable error.

The system may be further configured to disable the hardware resource if the hardware resource is non-critical. The system may also be further configured to retry the hardware resource after processor restart to determine if the error in the hardware resource can be cured by the processor reset.

According to another aspect of the invention, the system may further comprise a main memory, the system being configured to detect divergence by:

comparing memory commands generated by the primary processor with memory commands generated by the secondary processor;

executing only the memory commands generated by the primary processor; and signaling a divergence detection if the memory commands issued by the primary processor differ from the memory commands issued by the secondary processor.

The system may further comprise:

a bridge to an external network, the computer system being configured to:

detect a divergence in the operation of the primary and secondary processors at the bridge to the network; and shut off the bridge to the network immediately unless the error has previously been determined to be a recoverable error.

According to a further aspect of the invention, the error-handling module does divergence detection by comparing unique signatures of processor state received from the primary and secondary processors. The unique signatures may be generated by applying an algorithm to state information for the primary and secondary processors.

Still further, in the system, the reset and restart of the primary and secondary processors may include the step of:

conducting first and second flushes of cache memory of either the primary or the secondary processor.

According to another aspect of the invention, the bridge to the network is configured to conduct a high-speed reset and restart during the reset and restart of the primary and secondary processors. The bridge to the network may have a custom high-speed reset and restart procedure, or may be designed from scratch to reset and restart quickly.

The system may further comprise a watchdog timer, the system treating the error as a non-recoverable error if the watchdog timer expires during the reset and restart of the primary and secondary processors. The system typically conducts a hard-reset of the lockstep computer processing system upon expiry of the watchdog timer.

The computer system may further be configured to run the bridge to the network from a main memory until a bridge local memory has been initialized upon the reset and restart of the primary and secondary processors.

According to another aspect of the invention, the system further comprises a network resource for utilizing the primary and secondary processor over a network, the network resource being configured to:

send a data message to the network bridge over the network, and, when the data message is lost due to the resetting and restarting of the primary and secondary processors, to:

send a first inquiry message to the network bridge after a first timeout period, and, when the first inquiry message is lost, to:

send a second inquiry message after a second timeout period;

wherein the sum of the first and second timeout periods is selected to be greater than an expected recovery time for the primary and secondary processors.

In one embodiment, the network resource sends out no retries of the data message until a response is received to an inquiry message.

Further aspects of the invention will be apparent from the Detailed Description of the Drawings.

BRIEF DESCRIPTION OF THE DRAWINGS

The accompanying drawings, which are incorporated in and constitute a part of this specification, illustrate several embodiments of the invention and together with the description, serve to explain the principles of the invention. Wherever convenient, the same reference numbers will be used throughout the drawings to refer to the same or like elements.

DETAILED DESCRIPTION OF THE DRAWINGS

To enable one of ordinary skill in the art to make and use the invention, the description of the invention is presented herein in the context of a patent application and its requirements. Although the invention will be described in accordance with the shown embodiments, one of ordinary skill in the art will readily recognize that there could be variations to the embodiments and those variations would be within the scope and spirit of the invention.

Figure 1:
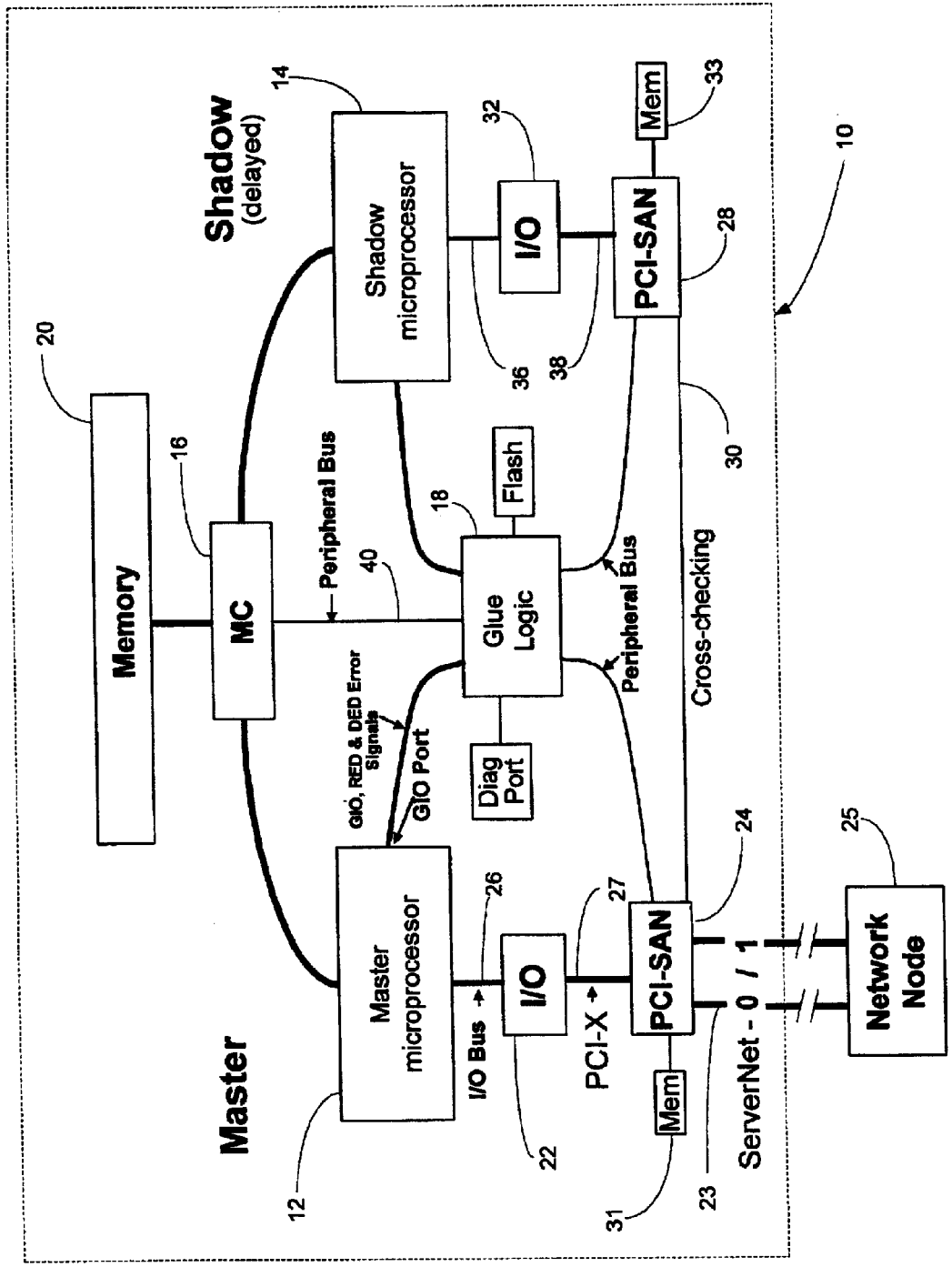
FIG. 1 is a simplified block diagram of the logical processor of the present invention formed from two interconnected processor units.

Referring now to the figures, and specifically for the moment FIG. 1, there is illustrated a logical processor designated generally with the reference numeral 10. It should be understood that the logical processor 10 usually forms a part of a larger data processing system that is not shown in detail in order to refrain from unduly complicating the figure. As FIG. 1 shows, the logical processor 10 includes a Master processor unit 12 and a Shadow processor unit 14, both of which also include various cache memory structures that may be internal or external, both to the processor or microprocessor forming the processor unit.

The Master processor 12 is coupled, via a memory checker 16, to a memory 20, and to an input/output (I/O) bridge 22 and a PCI to Server Area Network (SAN) I/O bridge 24 by a Master I/O bus 26 and a master PCI-X bus 27. The bridges 22 and 24 connect the logical processor 10 to SAN I/O links 23, providing the input/output gateway between the logical processor 10 and the remainder of the data processing system. For example, the logical processor 10 may communicate across the SAN with another network resource 25. The network resource 25 may be another logical processor, or other network node. In particular, the network resource 25 may be utilizing the logical processor 10 as a resource, or may desire to use the logical processor 10 as a resource, in which case loss of communications with the logical processor may have negative consequences as discussed below with reference to FIG. 3.

The master processor 12 also has a general input/output (GIO) port coupled to an error-handling module, in the illustrated embodiment comprising a "glue" logic 18. The "glue" logic 18 may be implemented as a field programmable gate array (FPGA), an application-specific integrated circuit (ASIC), a custom integrated circuit (IC) or discrete components, depending on the implementation criteria.

The PCI to SAN I/O bridge 24 is implemented as an ASIC that also does primary divergence checking by comparing output received from the shadow processor 14 via a shadow PCI to SAN I/O bridge 28 and a cross-checking bus 30. The primary divergence detection is done by comparing transmit symbol sequences in the SAN stacks contained in the bridges 24 and 28, and if there is any difference in the transmit symbol sequences produced by the master and shadow processors 12, 14, then a divergence is signaled to the "glue" logic 18. When the cross checking between the SAN-PCI bridges 24, 28 indicates a divergence, the PCI-SAN bridge 24 is immediately fenced off from the SAN 23. Divergence detection at this point is indicative of the potential of an error or data corruption that is about to propagate onto the SAN 23, which is why immediate isolation of the logical processor 10 from the SAN is required. However, the SAN-PCI bridge 24 is not fenced off immediately upon divergence detection if it has already been determined that the divergence is as a result of a recoverable error that will not cause data corruption. That is, referring to FIG. 2 (discussed in more detail below), there is no "Y" time for a divergence detected at the PCI-SAN bridges 24, 28. The PCI-SAN bridge 24 also has an associated local memory 31, while the shadow PCI-SAN bridge 28 has an associated local memory 33. The local memories 31, 33 are used for buffering and temporary work storage.

The Shadow processor unit 14 similarly connects via the memory checker 16, to the memory 20, and to a shadow (I/O) bridge 32 and to the shadow PCI to SAN I/O bridge 28 by a shadow I/O bus 36 and a shadow PCI-X bus 38. As for the master processor 12, the shadow processor 14 has a GIO port connected to the "glue" logic 18.

In principle, the detection of divergence need only be detected at open point, that is, where the data leaves the logical processor 10 at the PCI to SAN I/O bridge 24. That is, the processor could be designed with full redundancy, including two copies of main memory, and the results could be compared at only one point—where the data leaves the processor 10 and is placed on the SAN. However, to reduce the cost of the design and to reduce the latency error detection, a single copy of main memory 20 is provided. For this configuration, it is desirable to check any data that the master processor 12 writes to the memory 20 before it is written, because once written, we have lost the "second opinion"—there will be no other immediate opportunity to detect the error.

In one implementation of the memory checker 16, only write instructions issued by the master processor 12 and shadow processor 14 are compared to detect divergence. However, comparing read instructions can also reduce the error detection latency, and this is typically done in the embodiment of FIG. 1. Thus, the memory checker 16 functions to detect divergence in write data, write addresses, read addresses, and instructions. When a divergence is detected, the operation completes normally (using the master processor's instruction), and a divergence is reported to the "glue" logic 18 over peripheral bus 40.

When the master processor 12 issues a memory read command, the control instructions, addresses, and any data in the read command are checked against the corresponding memory read command issued by the shadow processor 14. If the read commands are not identical, the read operation is completed using the master processor's command, and a divergence is reported to the "glue" logic 18. If the read commands are identical, the master processor's read command is passed through to the memory 20 and the data from the memory 20 in response is passed by the memory checker 16 through to the master processor 12, as well as being "reflected" to the shadow processor 14.

Both the Master processor unit 12 and the Shadow processor unit 14 perform write operations. However, it is only the master processor unit 12 that is actually writing data to memory; the data "written" by the shadow processor unit 14 is compared in the memory checker 16 with that written to memory 20 by the master processor unit 12. Should the memory checker 16 detect a mismatch between any of the data, address, or control instructions between the memory write commands issued by the Master and Shadow processor units 12, 14, a divergence will be reported to the "glue" logic 18.

The memory checker 16 also saves historical data (e.g. the last few hundred memory commands) in a rotating buffer. This may be used for debugging, and is saved off as part of the error recovery procedures discussed below.

Further, in addition to doing divergence detection at the memory checker 16 and the PCI to SAN bridge 24, it is beneficial to do divergence detection "within" the master and shadow processors 12, 14. This detection is done by the "glue" logic 18 by comparing outputs from the GIO ports of the master and shadow processors 12, 14. This can also reduce the latency of divergence detection. This is particularly so in the case of processors having large cache memories. As a result of the presence of a large cache memory, a processor may operate for a large number of clock cycles without accessing main memory or providing an output on the I/O bus. Thus, the detection of divergence may take place many cycles after the divergence has occurred. To mitigate this, the master and shadow processors are configured to output to the GIO port a small number of linear feedback shift register (LFSR) signals that are likely to indicate divergence earlier than the memory or I/O interfaces. These LFSR signals are a compressed signature of the current state of the respective processor 12, 14. To generate these signals, each processor 12, 14 takes certain internal data (e.g. the program counter and selected internal flags) and applies a hashing algorithm to them. The result of the hashing algorithm is a small, testable signature that is related to the internal state of the processor. By comparing the signatures generated by the master processor 12 with the signatures generated by the shadow processor 14, a very early divergence detection can be done.

These LFSR signals are pushed out onto the GIO port when the GIO port is idle. Thus, by comparing the outputs of the GIO ports of the master processor 12 with the shadow processor 14, divergence may be detected more quickly than otherwise. This comparison is done in the "glue" logic 18, and handled as described in more detail below.

Generally, operation of logical-processor 10 has the Master and Shadow processor units 12, 14 operating in close synchrony to execute identical instruction streams, instruction by instruction—as indicated above. Preferably, the two processor units 12, 14 are not tightly locked, but operate within one or several processor clock cycles apart. This, as those of ordinary skill in this art will readily recognize, will require appropriate buffering in order to synchronize checking of the data, address, and control signals produced by the Master and Shadow processor units.

Before discussing error and divergence detection and handling, it is useful to discuss the difference between an error and a divergence, and to discuss the types of errors that may be encountered by the master and shadow processor units.

A divergence, while strictly considered to be any difference in the operation of the master and shadow processors, is more conveniently considered to be a divergence that has manifested itself at one of the divergence detection points. In the illustrated example, divergence is detected at the PCI to SAN bridge 24, the "glue" logic 18, and the memory checker 16. An error, on the other hand, is any error in the processing done by the processor 10, in the master processor 12, shadow processor 14 or other component. Error detection is typically done using known error-checking mechanisms utilized in microprocessors and computer memories. That is, the master processor 12 and the shadow processor 14 are themselves able to detect errors in their processing and to report an error notification to the "glue" logic 18. The error notification will also include an indicator that can be used to determine whether the error is a) fatal to the processor or b) will produce a divergence but is not actually an error that will compromise data integrity. An example of the latter is a correctable memory error.

Divergence detection is done using a comparison, although the detection and signaling of an error may be taken as an indicator of imminent divergence. An error will typically lead to a divergence if no corrective action is taken, but the appropriate corrective action may prevent divergence from occurring, or may mitigate the effects thereof. The occurrence of an error in the master or shadow processors 12,14 is signaled over a signal line to the "glue" logic 18 to provide this early warning. Of course, as a generalization, the longer time that passes from error or divergence detection without remedial action, the more serious the impact of the error or divergence will be.

The reporting of errors by the processors 12, 14 will in all likelihood predict the vast majority of divergences and allow a controlled recovery to take place as discussed below. Divergence detection occurring in the absence of this error reporting should be much less likely, but typically would indicate a more serious error.

Errors may be categorized as recoverable or non-recoverable. As the name suggests, a recoverable error is an error from which recovery is normally possible, and which typically will not result in data corruption or loss of data integrity. A non-recoverable error is considered to be an error that may result in loss of data integrity and from which normal recovery is not possible. When utilizing lockstepped processors, a recoverable error on one processor—while not resulting in data corruption—will nevertheless result in a divergence, since it will take additional processing and some number of clock cycles on the part of the one processor to recover from the error. To return the processors to lockstep, a reset of the processors is done as below after normal error handling (to deal with the recoverable error) is complete. For a non-recoverable error, the reset is both the mechanism to recover from the error and the mechanism to reestablish lockstep if lockstep has been lost. Also, for a recoverable error, the isolation of the processor 10 from the SAN can be accomplished in a more controlled manner (since corrupt data will not propagate onto the SAN), while for a non-recoverable error involving the risk of data corruption, the processor 10 is isolated more quickly to prevent corrupt data from propagating onto the SAN.

While these error definitions are useful for purposes of illustration, it should be noted that a non-recoverable error for one component may not be considered a non-recoverable error at a different level of the architecture. For example, a non-recoverable error occurring in the shadow processor 14 is typically a recoverable error as far as the processor 10 is concerned. This is because the shadow processor 14 does not write to memory or provide any actual output. There is thus no risk of data corruption occurring as a result of the non-recoverable error on the shadow processor, and the recovery of a non-recoverable error on the shadow processor 14 proceeds as for recoverable error recovery for the processor 10. Also, a non-recoverable error that does not threaten data integrity or does not cause a divergence (but which requires a reset to recover from the error) may be treated similarly to a recoverable error. For example, a resource that is not currently being utilized by the master processor may be lost to the processor. This will result in a hardware error signal, but will not cause divergence or data corruption as the resource is not being utilized. To recover from this error a reset is probably required, but this can be done in an orderly manner as if the error was a recoverable error.

Still further, processor resources may be pre-marked as being critical or optional resources. For example, floating point hardware may be marked as optional if there is a software floating point routine that may be used in place of the floating point hardware that will be fully functional but perhaps slower. Other examples may be portions of cache memory, or an optional part of the I/O bridges. If the resource that fails could compromise data integrity in the current or future processor operations, the resource is critical and the failure is treated as a non-recoverable error. If not, appropriate action may be taken during the recoverable error handling procedure. For example, the resource can be disabled upon processor restart, or a restart can be performed and a retry attempted to see if the resource itself only has a recoverable error that will be cured by the reset.

It is significant that the master and shadow processors 12, 14 themselves can detect a wide variety of errors that will eventually cause a divergence. This allows divergence to be predictively detected, potentially long before a divergence manifests. In particular, due to large cache memories, it is possible that one of the processors 12, 14 may run divergent on cached data for a significant period without accessing main memory or providing a detectable output.

Figure 2:
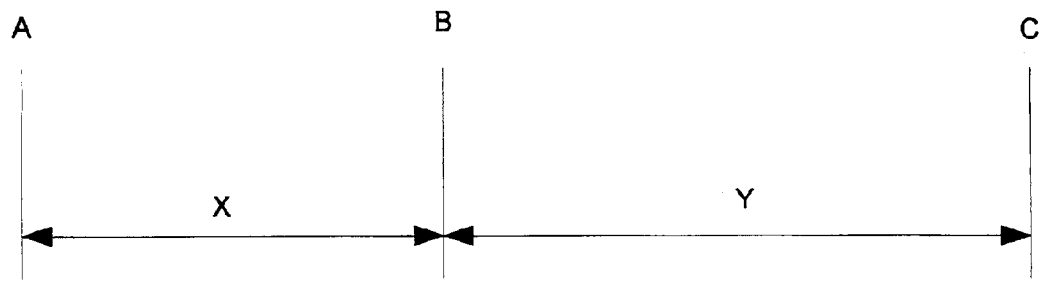
FIG. 2 is a timing diagram illustrating the detection and handling of errors and divergence for the system shown in FIG. 1.

Bearing this discussion in mind, FIG. 2 illustrates a timing diagram for recoverable error detection and recovery. For the purposes of the diagram, a recoverable error can be any one of a) a recoverable error on the master processor 12, b) a recoverable error on the shadow processor 14, c) a non-recoverable error on the shadow processor 14 or d) a non-recoverable error on a resource that is currently not being utilized by the processor 10. The non-recoverable error on the shadow processor 14 is considered to be a recoverable error for the system, because the shadow processor 14 is isolated and errors in the shadow processor 14 will not propagate to the memory 20 or onto the SAN 23. That is, the master processor 12 (and hence the processor 10) can continue operating despite the loss of the shadow processor 14, while an appropriate recovery is executed.

Turning Now to FIG. 2:

"A" is the earliest point at which a recoverable error can validly be reported to the "glue" logic 18;

"B" is the point at which divergence is reported to (or detected in) the "glue" logic 18;

"C" is the latest point at which a recoverable error can validly be reported to the "glue" logic 18;

"X" is the time from the recoverable error signal to observable divergence (this is typically not very long, since the processing of recoverable error handling will force a divergence in most cases).

"Y" is the maximum time from observable divergence to recoverable error signal receipt, during which time recoverable error handling can still be done.

A recoverable error signal may be received at any time from A to C and recoverable error handling can still be done. That is, the error does not result in disruption of the operation of the processor 10 (other than a loss of clock cycles to correct the error) and there is no need to fence off the processor 10 from the SAN I/O links 23 (i.e. stop further incoming or outgoing messages from passing between the SAN and the master and shadow processors 12, 14).

If a recoverable error is reported during the "X" time before observable divergence, the following steps are taken:

a. The "glue" logic 18 notifies the PCI to SAN bridges 24, 28 that a divergence will occur and notifies the PCI to SAN bridges to ignore the divergence when it does occur. The "glue" logic 18 also disables cross-checking (of output received across cross-checking bus 30) in the master PCI to SAN bridge 24.

b. There is no immediate fencing off of the SAN ports of the master PCI to SAN bridge 24;

c. Recoverable Error Recovery is Performed as Described Below.

If a recoverable error is reported during the time after observed divergence "B", but before "C," (That is, during the "Y" period), then the following steps are taken:

a. The "glue" logic 18 receives an observed divergence signal (or determines divergence from its comparison of the GIO ports) at time "B" and notifies the PCI to SAN bridges 24, 28 that a divergence has occurred.

b. The PCI to SAN bridges 24, 28 operate normally for a period of up to Y. The value of Y has previously been programmed into the bridges 24, 28.

c. The "glue" logic 18 receives a correctable error signal during time "Y"

d. The "glue" logic 18 notifies the PCI to SAN bridges 24, 28 to ignore the divergence.

e. There is no immediate fencing off of the SAN ports of the master PCI to SAN bridge 24;

f. Recoverable Error Recovery is Performed as Described Below.

If a recoverable error is reported the after observed divergence "B" and after "C," (That is, after the "Y" period), then a divergence indicating a fatal error has occurred. In such a case, the delay in identifying and handling the recoverable error has caused the situation to become critical, and the recoverable error is treated (upon the expiration of Y) as a non-recoverable error. The following steps illustrate this scenario:

a. The "glue" logic 18 receives an observed diverge signal (or determines divergence from its comparison of the GIO ports) at time "B" and notifies the PCI to SAN bridges 24, 28 that a divergence has occurred.

b. The PCI to SAN bridges 24, 28 wait for a period of up to Y. The value of Y has previously been programmed into the bridges 24, 28.

c. Upon expiration of Y, the PCI to SAN bridge 24 disables cross-checking in the master PCI to SAN bridge 24.

d. The PCI to SAN bridge 24 fences off the SAN links 23.

e. Low level operating system (OS) software will check the error registers in the "glue" logic 18, determine that a non-recoverable error has occurred, and execute non-recoverable error handling as described below in more detail.

Of course, the "glue" logic 18 may also receive a non-recoverable error signal on the GIO port of the master processor 12. If the non-recoverable error compromises data integrity, the following steps are performed:

a. The "glue" logic 18 receives a non-recoverable error signal from the master processor 12.

b. The low level OS software will check the error registers in the "glue" logic 18, verify that a non-recoverable error has occurred and that data integrity has been compromised, and report this to the "glue" logic 18.

c. The "glue" logic 18 sends an interrupt to the PCI to SAN bridge 24, which immediately fences off the SAN links 23 (i.e. no further incoming or outgoing messages pass between the SAN and the master and shadow processors 12, 14).

d. The low level OS software executes non-recoverable error handling as described in more detail below.

Alternatively, the "glue" logic 18 receives a non-recoverable error signal on from the GIO port of the master processor 12 that does not compromise data integrity. In such a case, the following steps are performed:

a. The "glue" logic 18 receives a non-recoverable error signal from the master processor 12.

b. The low level OS software checks the error registers in the "glue" logic 18, verifies that a non-recoverable error has occurred and that data integrity has not been compromised, and reports this to the "glue" logic 18.

c. The "glue" logic 18 asserts both a "Diverge" and a "Diverge$_{13}$Ignore" signal to the PCI to SAN bridges 24, 28, as well as disabling cross-checking in the master PCI to SAN bridge 24.

d. There is no immediate fencing off of the SAN ports of the master PCI to SAN bridge 24;

e. Recoverable Error Recovery is Performed as Described Below.

The detailed sequence of operations for recoverable error recovery is as follows. Note, this assumes that the error has been identified as recoverable before the expiry of Y in FIG. 2. Also, while the recoverable error recovery is described below primarily with respect to the occurrence of a recoverable error in the master processor, the procedures are equally applicable to the occurrence of a recoverable error on the shadow processor. Also, while the description below describes that the state of the master processor 12 is saved for use when restarting the master and shadow processors, the state of the shadow processor may also be saved for this purpose.

As discussed below, the recoverable error recovery involves the use of a "fast reset" procedure that utilizes a quicker reset and restart procedure than a normal or "full" reset and restart. As part of the fast reset, a pared down version of the built in self-test (BIST) routine is executed by the processor 10. This fast BIST does not include less-critical tests that are run during normal reset. The fast BIST is customized to balance the conflicting requirements of returning the processor 10 to normal operation as soon as possible and ensuring that the processor is indeed functioning correctly after the reset. Also, the fast reset preserves the contents of the memory 20, while a full reset does not. To ensure that the processor 10 returns to full functionality quickly, it will be appreciated that the fast reset has more stringent time restraints on it than a full reset.

1 A recoverable error occurs in the master processor 12. The master processor 12 generates two interrupts. The first interrupt is internal to the master processor, and is for internal error handling. The second interrupt is passed to the "glue" logic 18 to determine external error handling. As described below, the "glue" logic 18 will return an interrupt to the master processor 12 to instruct the master processor to conduct the error recovery.

2 The first, internal interrupt, invokes the appropriate low level OS software routine to handle the error, for example by scrubbing the cacheline, gathering data and setting flags for deferred error logging, and clearing any error status registers. The low level OS software handles the particular error in a known manner independently to the recovery from the divergence.

3 If a recoverable error occurs on the shadow processor 14, there is a divergence as soon as the shadow processor attempts to execute instructions that are not in its cache, and lockstep is lost as soon as it receives such an instruction. That is, the shadow processor 14 will receive a mirrored instruction that has been requested by the master processor 12, which has been executing instructions normally. The shadow processor 14, which has been dealing with the recoverable error, will not be expecting that instruction, and lockstep is lost. In a similar manner to the master processor 12, upon detection of the recoverable error, the shadow processor 14 generates two interrupts. The first interrupt is internal to the shadow processor, and is for internal error handling. The second interrupt is passed to the "glue" logic 18 to determine external error handling. As described below, the "glue" logic 18 will return an interrupt to the master processor 12 to instruct the master processor to conduct the error recovery.

4 The interrupt from the "glue" logic 18, (or one of the other components if appropriate e.g. a divergence detection by the PCI to SAN bus 24) is passed to the master processor 12, which generates an interrupt to the low level OS software.
5 The low level OS software then reads the available error registers and saves their contents to provide an error record.
6 The low level OS software then determines whether the error is a non-recoverable error or a recoverable error. In the case of a non-recoverable error, the reset proceeds as discussed in more detail below.
7 In the case of a recoverable error, the low level OS software now masks the error registers that did not indicate the original error. For example, in the case of a recoverable error reported on the GIO port of the master processor 12, it is necessary to mask the error registers for divergence detection in the memory checker 16 and in the PCI to SAN bridge 24. This disabling of cross checking is done to prevent the effects (i.e. divergence) of the same error from being reported as a new, unrelated error, while the original error is being dealt with.
8 The low level OS software then increments a counter for recoverable errors by the processor, and then checks a threshold for too many errors in a given time. If the threshold has been exceeded, then a full reset is performed. A full reset is the most drastic of the error-handling procedures. When a full reset is performed, the processor 10 is taken offline completely, and is lost as a resource to the larger computing system. Depending on the results of further diagnostic procedures, the processor 10 may or may not be returned to service.
9 The low level OS software then obtains further data (in addition to the initial data saved from the original error reporting). The further data includes the type of error, which processor had the error, memory checker 16 data such as status and selected history buffer data, "glue" logic 18 data such as the state of error and event source registers, master processor 12 register data including error syndrome bits, the address of the error and the processor error state; PCI to SAN bridge registers; I/O to PCI bridge registers; and appropriate sections of a low level OS software trace table (if implemented). Available shadow processor 14 data is also saved for error logging purposes, but this is normally less than the data saved for the master processor due to the more limited role played by the shadow processor 14. Normally, at least some shadow processor 14 error state data is saved.
10 The low level OS software then initiates a reset on the shadow processor 14 by setting an appropriate bit in the shadow processor 14 reset control register.
11 The low level OS software now invokes a SAN call to suspend operations of the PCI to SAN bridges 24, 28. This is done by dispatching the SAN Services Fast Reset Interrupt Process (FRIP). If the FRIP does not register, then the processor 10 is in some type of initialization, and the SAN diverts to full reset handling. If the FRIP is already running, then back-to-back errors have occurred in too short a time for them both to be handled, or there is an error in operation flow and the SAN also diverts to full reset handling.
  11.1 The FRIP obtains and maintains control of the processor execution throughout the recoverable error recovery process. The FRIP runs at the highest priority of any interrupt process, to prevent it from being delayed.
  11.2 The FRIP then initiates a call to the low level OS software to do a cache flush. The low level OS software does the cache flush, returning the contents of the caches of master processor 12 to main memory. This first cache flush is done to reduce the time required for the cache flush during the time the processor 10 is blacked out from the SAN. When the cache flush is complete, the SAN checks if there were any uncorrectable cache memory errors. If so, the SAN collects relevant error logging data and diverts to a full reset. If a correctable error occurs, the normal low level OS software recovery routine for the correctable cache error is allowed to run uninterrupted upon return of the cache flush routine to the low level OS software.
  The low level OS software now returns control to the SAN Services FRIP.
12 The FRIP will:
  12.1 Issue a suspend instruction to a direct memory access (DMA) engine in the PCI to SAN bridge 24. The state of the DMA engine will be saved so that it can be restarted appropriately.
  12.2 Save the state of the PCI to SAN bridge 24 to be restored after the fast reset. The contents of the PCI to SAN bridge 24 local memory will be lost upon reset.
  12.3 Turn off the SAN ports in the PCI to SAN bridge 24. The critical blackout period has now begun.
  12.4 Invoke a "fast reset finish" low level OS software routine.
13 The low level OS software "fast reset finish" routine will now save all required states to resume operation after reset. In particular, this routine will:
  13.1 In the master processor 12, process any outstanding incoming I/O interrupts by checking all of the PCI to SAN bridge 24 interrupt queues and copying their contents to shadow queues in main memory. As the SAN ports are shut off, this closes the door on any I/O that has been acknowledged by the PCI to SAN bridge 24 but had not yet been processed by the master processor 12.
  13.2 Flush master processor 12 cache to main memory. Assuming that the first flush left the cache fairly clean, this will take a very short time. The second flush is done to close the door on any I/O that came in before the SAN ports could be shut down.
  13.3 Disable master processor interrupts. This keeps any access to main memory from occurring during the fast reset.
  13.4 Reset the PCI to SAN bridge 24 ASICs and the I/O bridge 22 ASICS. That is, all the I/O chips between the master processor 12 and the SAN are reset. When these chips are restarted, they may restart using custom fast restart procedures (e.g. shorter built in self-test (BIST) routines, faster startup loops etc.), or they may have been designed initially to have fast reset and restart procedures.
  13.5 From the master processor 12, notify the "glue" logic 18 that the master processor 12 is ready to reset. This is done by writing a bit (via the GIO port, since the bridges 22 and 24 are resetting) to a master processor reset control register in the "glue" logic 18. There is also a watchdog timer that would cause a full reset if this bit is not written before the watchdog timer expires.
14 The "glue" logic 18 does a fast reset on both master and shadow processors 12, 14. This fast reset low level OS software routine executes from the "glue" logic cache and loops without access to main memory, to avoid any main memory 20 access during the fast reset.
15 The low level OS software now resumes processing. It firstly checks the appropriate flags to determine the nature of the reset (e.g. fast reset, full reset, watchdog timer reset etc.). For the fast reset case, the low level OS software routine continues as follows:

15.1 The required states for the master and shadow processors 12, 14 are initialized. If desired, further processor registers can be logged for error logging purposes.

15.2 The I/O ports of the master and shadow processors 12, 14 are initialized 15.3 The master and shadow I/O bridges 22, 32 are initialized 15.4 The memory checker 16 is initialized and its error registers are unmasked 15.5 The low level OS software uses the saved stack data to return the low level OS software FRIP routine to its status as it was when the FRIP called the "fast reset finish" routine.

15.6 The FRIP waits for the bridges 24, 28 to complete their reset, and then restarts them as follows:

15.6.1 Reinitialize the bridges 24, 28 using the stack data previously saved to memory 15.6.2 Enable the SAN ports—the blackout period is now over 15.6.3 Set a flag to disallow writes to the local memory 31, 33 of the bridges 24, 28 while the memory is being initialized 15.6.4 Start initialization of the bridges' 24, 28 local memory 31, 33

15.6.5 Restore from memory any operations that were in progress in the bridges 24, 28

15.6.6 Restart any and all interrupts that were saved into the shadow queues 15.6.7 Note that the initialization and reloading of the local memories 31,33 of the bridges 24, 28 might take a long time relative to the other processes in the recovery. To ensure that this does not unnecessarily delay the recovery process, the PCI to SAN bridges 24, 28 run from main memory 20 until the local memories 31, 33 have initialized. When the local memories 31,33 have been initialized, the initialization process will generate an interrupt to the low level OS software, which will switch the interrupt queue from the main memory to the local memories 31, 33.

15.6.8 Return to low level OS software from FRIP 15.7 Any shadow error data that was saved is now passed from the shadow processor 14 to the master processor 12 and saved for further error logging purposes 15.8 Any process or interrupt process that was suspended due to SAN Services FRIP being invoked is allowed to run and normal operation resumes.

16 Error information for the fast reset process is logged to the main event manager of the processor 10

17 Any necessary post-processing completes. For example, some of the processes (such as local memory initialization for the bridges 24, 28 and the subsequent establishment of the access validation and translation functions of the bridges 24, 28) initiated in the fast reset may take longer to complete than the actual fast reset procedure, or may in fact only be called after the fast reset procedure has virtually completed. These procedures are allowed to run and complete, and are considered to be part of the post-processing.

When a non-recoverable error occurs on the master processor 12, or one of the conditions occurs that mandates non-recoverable error handling, then non-recoverable error handling is conducted. When a non-recoverable error for the processor 10 is encountered, the processor 10 is considered to be compromised and data integrity is threatened. Non-recoverable error handling involves fencing off the processor 10 from the SAN in a timely manner to ensure that data corruption does not propagate to the SAN. The processor 10 is then shut down under conventional non-recoverable error handling, and is lost as a resource. Further diagnostics/repair/replacement then proceeds in a known manner.

Up to this point, only the effect of errors on the internal operation of the processor 10 has been considered. However, the effect of errors and error recovery on external devices also needs to be considered. As discussed above, the error recoveries are structured to ensure as far as possible that data corruption will not leave the processor 10. This is done by fencing off the SAN ports before any corrupt data can leave the processor 10. However, the processor 10 itself is a resource that may be being utilized by external devices, and the disappearance of this resource may adversely affect the operation of external devices. Of particular importance is the timing of the various events that take place during error recovery.

It is desirable to have the recoverable error recovery procedure take place quickly. Of specific concern is the period in which the incoming packets from the SAN are not processed. During this 'blackout' period, packets originating from other nodes will not be acknowledged. If retries time out, then the processor 10 will be taken off-line.

The recoverable error recovery procedure can be summarized as follows, showing typical timing for the current hardware implementation:

T1A—Time for the processor 10 to recognize an error, send it to the "glue" logic 18, have the hardware process it and send an interrupt over the PCI—X bus 27.

T1B—Time for the low level OS software to receive and respond to the interrupt. This time period is taken as the longest possible period that low level OS software will take to respond to an interrupt.

T2—Time for the master processor 12 to flush its cache for the first and longest time.

T3—Time for the low level OS software to suspend outgoing operations, save various states and prepare for reset. This ends at the low level OS software act, which is to turn off all incoming data and tell the "glue" logic 18 that the processor 10 is ready to reset.

Incoming data blackout begins at this point.

T4—Time for the master processor 12 to flush its cache for a second time.

T5—The hardware now resets, which includes:

Reset time for the shadow and master processors 12, 14.

Reset time for the I/O bridge 22.

Reset time for the PCI to SAN bridges 24, 28.

T6—'Fast reset' time before software can turn on I/O hardware:

BIST time, I/O bridge 22 initialization, PCI to SAN bridges 24, 28 initialization, start local memory BIST, enable the SAN logic in the PCI to SAN bridge 24 and acknowledge incoming packets etc.

At the end of this time, the blackout is over.

T7—End of PCI to SAN bridges 24, 28 local memory 31,33 initialization.

Copy data from main memory to PCI to SAN bridges' 24, 28 local memory 31, 33 and switch PCI to SAN bridges 24, 28 to local memory 31, 33.

T8—The low level OS software restores process state and OS continues as before.

During the blackout period, SAN packets (originating for example from network resource 25) will be lost. Losing a packet is not a problem since the SAN architecture allows for packet loss. Losing an inquiry message however has more serious repercussions. If an inquiry message is lost, the operational software of the larger system (i.e. a SAN cluster) may decide to remove the processor 10 as a resource on the system. This is contrary to the purpose of the recoverable error recovery (which is to return the processor 10 and the related larger system to full functionality with minimal disruption).

There are two types of inquiry messages. The first is not unlike a ping, and is used initially to determine if a resource is available. The second type of inquiry message is used as a query when a message or packet has not been acknowledged. Instead of retrying the message or packet, an inquiry message that includes data and a special transaction ID is sent. No retries of the original message or packet are attempted until the inquiry message is returned. If an inquiry message is lost (i.e. times out with no response), the system (i.e. the cluster) will first elevate the "error" to a higher level of severity and may in fact mark the target as down and remove it as a resource to the system. This is not desirable in the invention, where an attempt is being made to recover in a controlled manner that will enable the processor to continue to function as if the error had not occurred.

An inquiry message loss problem can occur when a packet and its associated inquiry message are both sent during the blackout time. For example, assume that a blackout starts near the end of the receipt of a normal packet. The client that sent the packet will send an inquiry message within a certain time (the packet time-out time) if the packet is not acknowledged. If the packet time-out time is less than the blackout time, the inquiry message may also be lost. Now it looks as though the processor 10 has failed, and it may be removed as resource from the larger system. The current embodiment of the invention proposes a double inquiry message timing solution. That is, after the transmission of the inquiry message, a second inquiry message is sent after a certain time (the inquiry message time-out time) if no response is received. The inquiry message time-out time is predefined to be longer than the longest expected blackout time. Alternatively, the sum of the packet time-out time and the inquiry message time-out time must be more than the longest expected blackout time.

Figure 3:
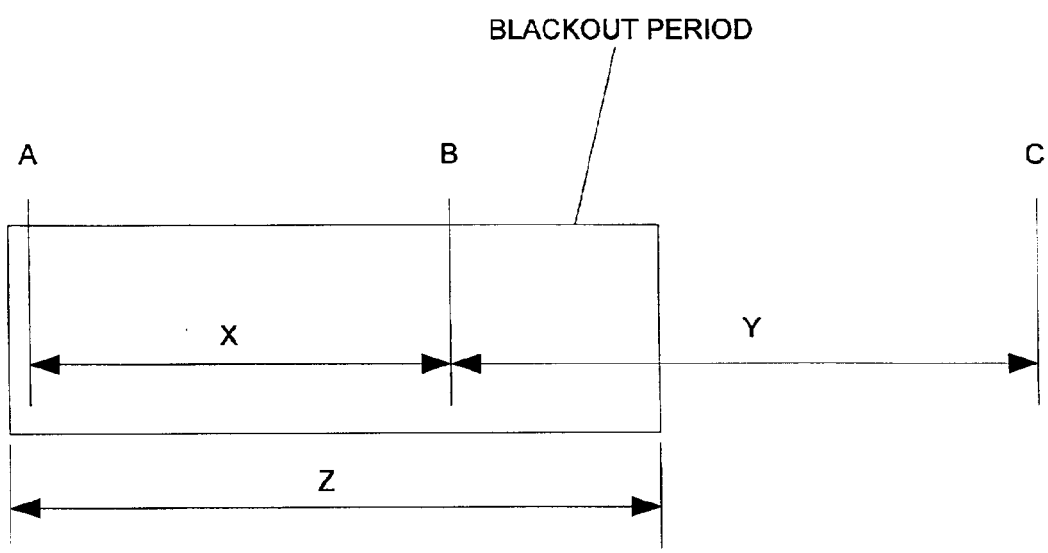
FIG. 3 is a timing diagram illustrating the use of inquiry messages to prevent a recovering lockstep system from being removed as a resource.

This scenario is shown in FIG. 3, which illustrates a blackout period having a duration of Z. A normal packet from the network resource 25 arrives at time A during the blackout period, and is lost. After waiting for a packet time-out X, the network resource 25 sends out an inquiry message, which arrives at time B (note, for purposes of simplicity we are assuming that the various transmissions arrive instantaneously), and the inquiry message is also lost. However, a further inquiry message is provided that is sent by the network resource 25 after inquiry message time-out time Y. This inquiry message arrives at time C, which is after the end of the blackout period. It will be apparent from the diagram that, by making sure that the sum of X and Y is greater than Z, it can be assured that the second inquiry message will always succeed, and that the processor 10 will not prematurely be declared unavailable.

The implementation of the double inquiry message solution may depend on the type of inquiry message used. For example, the SAN protocol provides for three types of inquiry messages—client inquiry messages, pre-inquiry messages, and error recovery inquiry messages. Client inquiry messages are used for discovery purposes. For example, "sniffers" used by the system to check for viable paths. As it is less critical if a client inquiry message is lost, the current implementation does not alter the one inquiry message implementation for client inquiry messages, although a two client inquiry message system may be implemented. Pre-inquiry messages are used when verifying a particular path before it is used. For pre-inquiry messages, two inquiry messages are used, each with a 20 ms timeout. Error recovery inquiry messages are used for verification before client data is resent, and are discussed above with reference to FIG. 3. For error recovery inquiry messages, two inquiry messages are used, each with a 20 ms timeout (i.e. 20 ms packet timeout and 20 ms inquiry message timeout).

Figure 4:
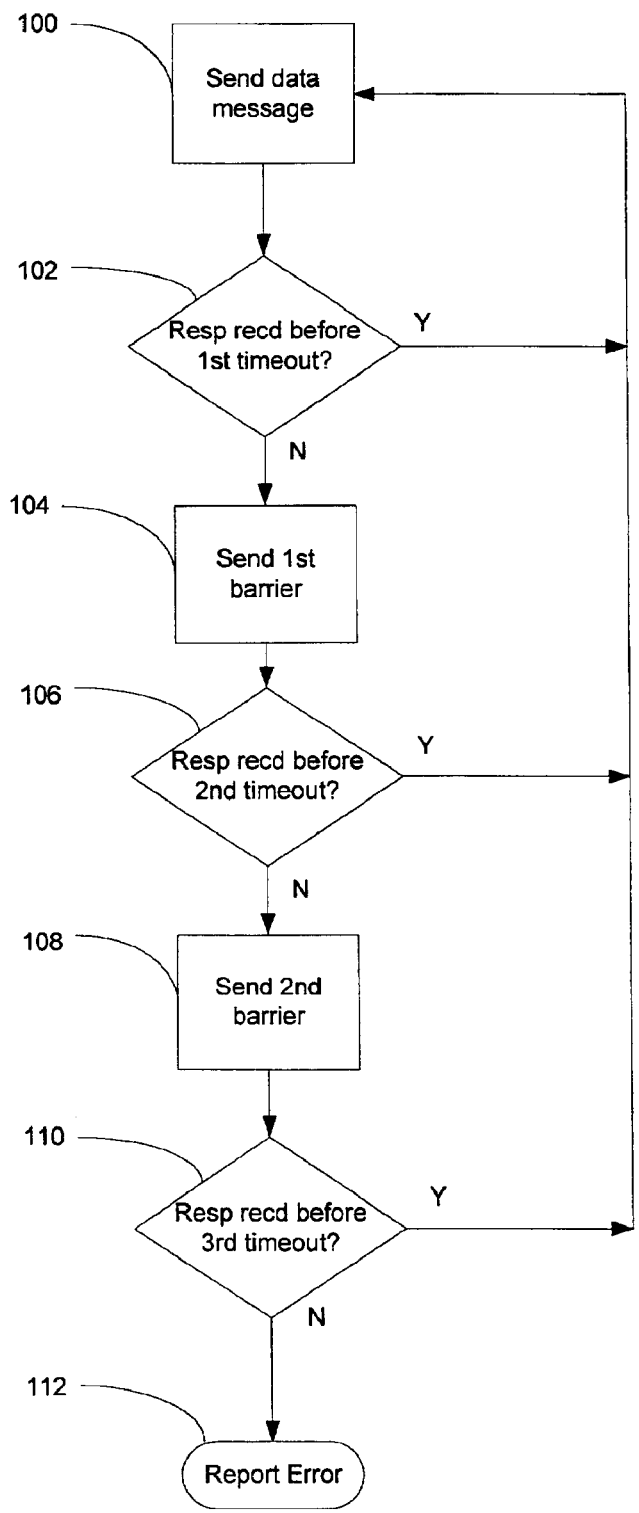
FIG. 4 is a flowchart illustrating the transmission of inquiry messages to a system undergoing a recovery.

The inquiry message method executed by the network resource 25 is shown in FIG. 4. Firstly, a data message is sent 100 to the logical processor 10. The logical processor 10 is currently executing a recovery procedure as described above. If a response is not received 102 from the logical processor 10 before the expiry of the first timeout period X (see FIG. 3), a first inquiry message is sent 104. As the logical processor 10 is still conducting the error recovery procedure (see FIG. 3), the inquiry message is lost. If the network resource 25 does not receive 106 a response by the second timeout period Y (see FIG. 3), a second inquiry message is sent 108. As discussed above, the sum of the two timeout periods X and Y is selected to be longer than the expected recovery period Z for the logical processor 10. Accordingly, if the failure of the logical processor to respond to the data message is as a result of conducting the error recovery procedure discussed above, the second inquiry message will be received 110 and the original data message will be resent. If however, no response is received after a third timeout period, the failure of the logical processor 10 is deemed to be for another reason, and the error is reported to a SAN administrator function for handling. For example, the SAN administrator function may remove the logical processor as a network resource, or elevate the error status of the resource to a higher level.

Although the present invention has been described in accordance with the embodiments shown, variations to the embodiments would be apparent to those skilled in the art and those variations would be within the scope and spirit of the present invention. Accordingly, it is intended that the specification and embodiments shown be considered as exemplary only, with a true scope of the invention being indicated by the following claims and equivalents. Finally, all patents and patent applications mentioned herein are incorporated by reference herein as if explicitly set forth.

What is claimed is:

1. A method of error recovery in a lockstep computer processing system, the system comprising a primary processor and a secondary processor and a bus bridge to a network, comprising the steps of:

operating the primary and secondary processors in lockstep;

receiving an error notification resulting from an error in either the primary processor or the secondary processor;

determining if the error is a recoverable error;

if the error is a recoverable error, then
   saving the state of either the primary or the secondary processor to a memory; and
   resetting and restarting the primary and secondary processors using the saved state;

wherein the step of restarting the primary and secondary processors using the saved state further includes the step of:

running the bridge to the network from a main memory until a bridge local memory has been initialized.

2. The method of claim 1 further comprising the steps of:
detecting a divergence in the operation of the primary and secondary processors before receiving the error notification;
waiting for a predetermined time after detecting the divergence; and
if the error notification is received before the expiry of the predetermined time and if the error is determined to be a recoverable error, then treating the error as a recoverable error.

3. A method of error recovery in a lockstep computer processing system, the system comprising a primary processor and a secondary processor, comprising the steps of:
operating the primary and secondary processors in lockstep;
detecting a divergence in the operation of the primary and secondary processors;
receiving an error notification resulting from an error in either the primary processor or the secondary processor;
determining if the error is a recoverable error;
if the error is determined to be a recoverable error and if the error is received within a predetermined time after detecting the divergency, then saving the state of either the primary or the secondary processor to a memory, and resetting and restarting the primary and secondary processors using the saved state;
wherein, if the error notification is received after the expiry of the predetermined time, then treating the error as a non-recoverable error.

4. The method of claim 1 wherein a non-recoverable error on the secondary processor is treated as a recoverable error.

5. The method of claim 3 further comprising the steps of:
if the error is determined to be a non-recoverable error, then
disabling a bridge between the processors and a network before data corruption resulting from the error can propagate onto the network.

6. The method of claim 1 wherein a hardware error that results in the loss of a resource that is currently not being used by the primary processor is treated as a recoverable error.

7. The method of claim 1 wherein the error notification reports an error occurring in a hardware resource, and wherein the error notification includes an identifier that can be used to determine whether the hardware resource is critical or non-critical.

8. The method of claim 7 wherein the hardware resource is disabled if the hardware resource is non-critical.

9. The method of claim 8 wherein the hardware resource is retried after processor restart to determine if the error in the hardware resource can be cured by a processor reset.

10. The method of claim 3 wherein the system includes a single main memory, the step of detecting divergence comprises the steps of:
comparing memory commands generated by the primary processor with memory commands generated by the secondary processor;
executing only the memory commands generated by the primary processor; and
signaling a divergence detection if the memory commands issued by the primary processor differ from the memory commands issued by the secondary processor.

11. The method of claim 1 further comprising the steps of:
detecting a divergence in the operation of the primary and secondary processors at the bridge to the network; and
shutting off the bridge to the network immediately unless the error has previously been determined to be a recoverable error.

12. The method of claim 3 wherein the divergence detection is conducted by comparing unique signatures of processor state received from the primary and secondary processors.

13. The method of claim 12 wherein the unique signatures are generated by applying an algorithm to state information for the primary and secondary processors.

14. The method of claim 1 further comprising the steps of:
conducting first and second flushes of cache memory of either the primary or the secondary processor.

15. The method of claim 1 further comprising the steps of:
conducting a high-speed reset and restart of the bridge to the network.

16. The method of claim 15 wherein the bridge to the network has a custom high-speed reset and restart procedure.

17. The method of claim 1 further comprising the steps of:
setting a watchdog timer; and
treating the error as a non-recoverable error if the watchdog timer expires before the resetting of the primary and secondary processors.

18. The method of claim 17 wherein the step of treating the error as a non-recoverable error comprises the step of:
conducting a hard-reset of the lockstep computer processing system.

19. The method of claim 1 wherein if the error is a recoverable error, then also disabling communication between the processors and the network; and if the error is determined to be a non-recoverable error, the disabling communication between the processors and the network before data corruption resulting from the error can propagate onto the network.

20. The method of claim 1 wherein the lockstep computer processing system is being utilized by a network resource, the network resource:
sending a data message to the lockstep computer processing system, the data message being lost due to the resetting and restarting of the primary and secondary processors;
sending a first inquiry message to the lockstep computer processing system after a first timeout period, the first inquiry message being lost due to the lockstep computer processing system being unavailable; and
sending a second inquiry message after a second timeout period;
wherein the sum of the first and second timeout periods is selected to be greater than an expected recovery time for the lockstep computer processing system.

21. The system of claim 20 wherein the network resource sends out no retries of the data message until a response is received to an inquiry message.

22. A computer system comprising:
a primary processor and a secondary processor being configured to operate in lockstep, and a bus bridge to a network; and
an error-handling module to receive an error notification resulting from an error in either the primary processor or the secondary processor, to determine if the error is a recoverable error;
if the error is a recoverable error, then to initiate saving the state of either the primary or the secondary processor to a memory and to reset and restart the primary secondary processors using the saved state;

the computer system being configured to run the bus bridge to the network from a main memory until a bridge local memory has been initialized upon the reset and restart of the primary and secondary processors.

23. The system of claim 22 wherein the error-handling module is further configured to receive a notification of a divergence in the operation of the primary and secondary processors before receiving the error notification, the error-handling module being further configured to wait for a predetermined time after receiving the notification of divergence; and if the error notification is received before the expiry of the predetermined time and if the error is determined to be a recoverable error, to treat the error as a recoverable error.

24. A computer system comprising:

a primary processor and a secondary processor being configured to operate in lockstep; and an error-handling module configured (a) to receive a notification of diverence in the operation of the primary and secondary processors and to receive an error notification resulting from an error in either the primary processor of the secondary processor, to determine if the error is a recoverable error, (b) if the error notification signal is received before the expiry of a predetermined time after receiving the notification of divergence and if the error is determined to be a recoverable error, then to initiate saving the state of either the primary or the secondary processor to a memory and to reset and restart the primary and secondary processors using the saved state; and (c) to treat the error as a non-recoverable error if the error notification is received after the expiry of the predetermined time.

25. The system of claim 22 wherein a non-recoverable error on the secondary processor is treated as a recoverable error.

26. The system of claim 24 further comprising a bridge to a network, wherein if the error is determined to be a non-recoverable error, then the system is configured to disable the bridge to the network before data corruption resulting from the error can propagate onto the network.

27. The system of claim 22 wherein, in use, a hardware error that results in a loss of a resource that is not being used by the primary processor is treated as a recoverable error.

28. The system of claim 22 wherein, in use, the error notification reports an error occurring in a hardware resource, and wherein the error notification includes an identifier that can be used to determine whether the hardware resource is critical or non-critical.

29. The system of claim 28 wherein the system is further configured to disable the hardware resource if the hardware resource is non-critical.

30. The system of claim 28 wherein the system is further configured to retry the hardware resource after processor restart to determine if the error in the hardware resource can be cured by a processor reset.

31. The system of claim 24 further comprising a main memory, the system being configured to detect divergence by:

comparing memory commands generated by the primary processor with memory commands generated by the secondary processor;

executing only the memory commands generated by the primary processor; and signaling a divergence detection if the memory commands issued by the primary processor differ from the memory commands issued by the secondary processor.

32. The system of claim 22 wherein the computer system is configured to:

detect a divergence in the operation of the primary and secondary processors at the bridge to the network, and to shut off the bridge to the network immediately unless the error has previously been determined to be a recoverable error.

33. The system of claim 24 wherein the error-handling module does divergence detection by comparing unique signatures of processor state received from the primary and secondary processors.

34. The system of claim 33 wherein the unique signatures are generated by applying an algorithm to state information for the primary and secondary processors.

35. The system of claim 22 wherein the reset and restart of the primary and secondary processors includes the step of:

conducting first and second flushes of cache memory of either the primary or the secondary processor.

36. The system of claim 32 wherein the bridge is configured to conduct a high-speed reset and restart during the reset and restart of the primary and secondary processors.

37. The system of claim 36 wherein the bridge to the network has a custom high-speed reset and restart procedure.

38. The system of claim 22 further comprising a watchdog timer, the system treating the error as a non-recoverable error if the watchdog timer expires during the reset and restart of the primary and secondary processors.

39. The system of claim 38 wherein the system conducts a hard-reset of the lockstep computer processing system upon expiry of the watchdog timer.

40. The system of claim 22 wherein the system is operable, (a) if the error is determined to be a recoverable error, also to disable communication between the processors and the network; and (b) if the error is determined to be a non-recoverable error, to disable communication between the processors and the network before data corruption resulting from the error can propagate onto the network.

41. The system of claim 22 further comprising a network bridge associated with the primary and secondary processor and a network resource for utilizing the primary and secondary processor over a network, the network resource being configured to:

send a data message to the network bridge over the network, and, when the data message is lost due to the resetting and restarting of the primary and secondary processors, to:

send a first inquiry message to the network bridge after a first timeout period, and, when the first inquiry message is lost, to:

send a second inquiry message after a second timeout period;

wherein the sum of the first and second timeout periods is selected to be greater than an expected recovery time for the primary and secondary processors.

42. The system of claim 41 wherein the network resource sends out no retries of the data message until a response is received to an inquiry message.

* * * * *

UNITED STATES PATENT AND TRADEMARK OFFICE
CERTIFICATE OF CORRECTION

PATENT NO. : 6,948,092 B2
APPLICATION NO. : 10/061435
DATED : September 20, 2005
INVENTOR(S) : Thomas J. Kondo et al.

Page 1 of 1

It is certified that error appears in the above-identified patent and that said Letters Patent is hereby corrected as shown below:

On the title page, item (75), in "Inventors", in column 1, line 5, after "(US);" insert -- Michael T. Chan, San Francisco, CA (US); --.

In column 11, line 67, delete "Diverge$_{13}$Ignore" and insert -- Diverge_Ignore --, therefor.

In column 19, line 27, in Claim 3, delete "divergency" and insert -- divergence --, therefor.

In column 20, line 35, in Claim 19, after "error," delete "the" and insert -- then --, therefor.

In column 20, line 55, in Claim 21, delete "system" and insert -- method --, therefor.

In column 21, line 1, in Claim 22, after "primary" insert -- and --.

In column 21, line 22, in Claim 24, delete "diverence" and insert -- divergence --, therefor.

In column 21, line 25, in Claim 24, delete "of" and insert -- or --, therefor.

Signed and Sealed this

Eighth Day of December, 2009

David J. Kappos
*Director of the United States Patent and Trademark Office*